United States Patent [19]

Limbach et al.

[11] 4,111,634
[45] Sep. 5, 1978

[54] APPARATUS FOR PRODUCING PAPERMAKER'S FELT

[75] Inventors: Paul Limbach, Downington, Pa.; Paul Socha, Whitesboro, N.Y.

[73] Assignee: H. Waterbury & Sons Company, Oriskany, N.Y.

[21] Appl. No.: 724,103

[22] Filed: Sep. 16, 1976

[51] Int. Cl.² .............................................. B29D 3/02
[52] U.S. Cl. ................................... 425/505; 264/286; 425/516; 425/517; 425/113; 425/145; 425/325
[58] Field of Search ............ 139/425 A; 162/DIG. 1; 156/500, 244; 425/113, 325, 327, 369, 373, 396, 470, 517, 516, 145, 150, 505, 385, 394

[56] References Cited

U.S. PATENT DOCUMENTS

| | | | |
|---|---|---|---|
| 1,908,658 | 5/1933 | Dean | 425/369 X |
| 2,975,822 | 3/1961 | Gent et al. | 425/517 X |
| 3,034,941 | 5/1962 | Hessenthaler et al. | 156/244 UX |

FOREIGN PATENT DOCUMENTS 563,937  6/1957  Italy ........................................ 425/327

*Primary Examiner*—Francis S. Husar
*Assistant Examiner*—Mark Rosenbaum
*Attorney, Agent, or Firm*—Cooper, Dunham, Clark, Griffin & Moran

[57] ABSTRACT

This invention contemplates an apparatus for affixing to a papermaking felt a plurality of beads comprising means for supporting a papermaking felt having a working surface and means for applying beads of plastic backing, said beads extending away from said working surface and having top portions which are spaced from each other along said working surface to form channels for liquid flow.

10 Claims, 6 Drawing Figures

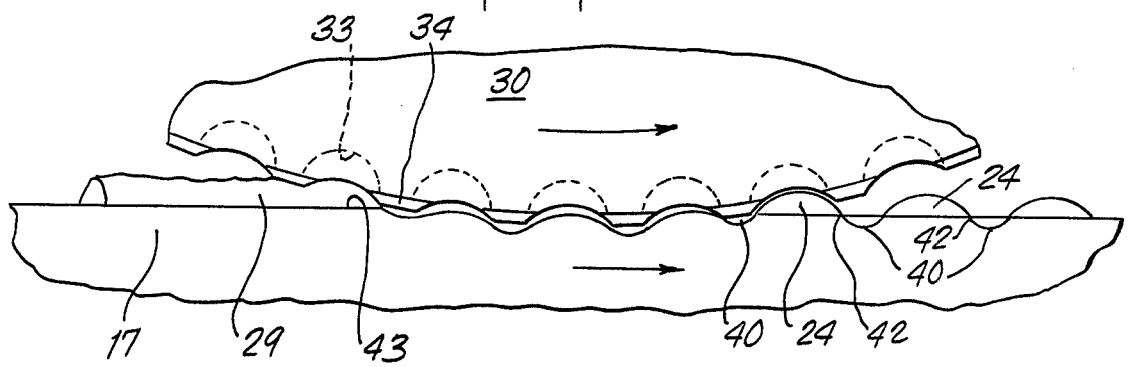
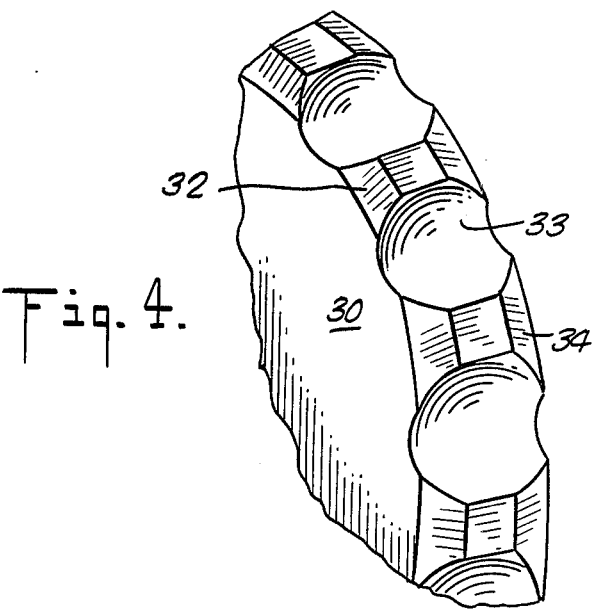
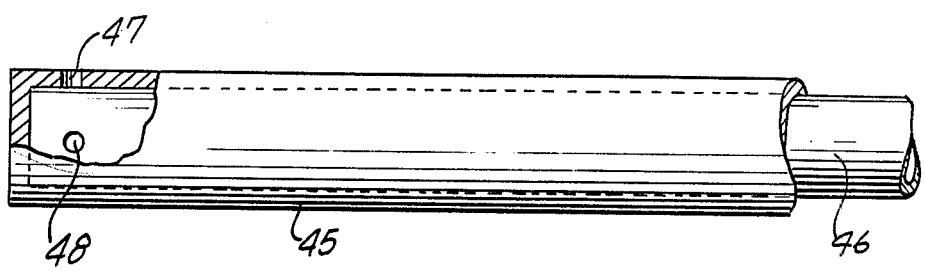

APPARATUS FOR PRODUCING PAPERMAKER'S FELT

RELATED APPLICATION

This application describes and claims apparatus for the production of products described and claimed in concurrently filed application Ser. No. 723,967.

BACKGROUND

In the production of paper, a layer of fiber slurry is deposited upon a belt. The belt is permeable, and some of the liquid in the slurry is drawn by vacuum through the belt, leaving a damp fiber layer. This damp layer is transferred onto another belt made of papermaking felt, and this second belt, together with the damp fiber layer on it, passes through rollers which squeeze out some more liquid from the fiber layer. Subsequently, the fiber layer is dried to evaporate more of the liquid and leave a layer of dry paper. As the drying or evaporation process is expensive, it is important to remove as much liquid as possible before the evaporation step. To this end, many variations of rollers and papermaking felts have been tried.

It has been found in accordance with the invention described and claimed herein that papermaker's felts with improved capacities for liquid removal are possible when the felt is modified by a pattern of beads. This modified felt is the subject of copending application Ser. No. 723,967 filed Sept. 16, 1976, which is hereby incorporated by reference. This application describes and claims the apparatus of making such beaded papermaking felt.

Prior U.S. Pat. No. 3,549,712 discloses a method of making an apertured belt that, as described above, is to be drawn over a vacuum. U.S. Pat. Nos. 3,915,202; 3,928,699; 3,657,068; 3,617,442; 3,603,354 and 3,613,258 disclose various types of papermaking felt, but none of them discloses the paper-making felt to which said copending specification is directed or the apparatus for the making of such felt to which this specification is directed. U.S. Pat. No. 3,772,055 discloses a method for strengthening fabric by applying dots of stiffening agent. The stiffening agent is printed onto the fabric by screen stencils. There is also art in this field of a paper-making felt with lines or rows of plastic backing applied to its working surface.

SUMMARY OF THE INVENTION

This invention contemplates an apparatus for affixing to a papermaking felt a plurality of beads, which may be connected, comprising means for supporting a papermaker's felt having a working surface and means for applying the beads of a material different from the material of the felt, said beads extending away from said working surface and having top portions which are spaced from each other along said working surface to form channels for liquid flow.

In papermaking, there is need for a belt-like structure called a papermaking felt to convey paper slurry through rollers which squeeze out liquid from that slurry to form paper. As the only other convenient way to extract liquid is by costly evaporation, it is desired that as much water as possible be squeezed out by these rollers. To this end, a felt belt-like structure which is well known in the art has affixed to it beads of plastic backing. The benefits of such beads are many. They include an increased drying ability due to the greater ability of the liquid to escape after being squeezed out by the rollers, and the characteristic that if dislodged only one bead will come off instead of a whole row of plastic material. Other benefits are described in the copending application Ser. No. 723967, filed Sept. 16, 1976.

OBJECTS

It is an object of this invention to provide an apparatus for the production of a papermaking felt having plastic beads attached thereon.

It is an object of this invention to provide an apparatus to secure the plastic backing to the felt so that if any portion is dislodged only that portion will come off, and not take with it any other portions of the backing.

How the foregoing and other objects are accomplished is further set out in the detailed description and the drawings in which:

FIG. 4 is a perspective view of a portion of a bead applying wheel which is a part of said machine.

FIG. 5 is a sectional view of the wheel of FIG. 4 in operation to apply beads to the felt.

FIG. 6 is a front view of an alternate apparatus to apply a bead.

DETAILED DESCRIPTION

Figure 1:
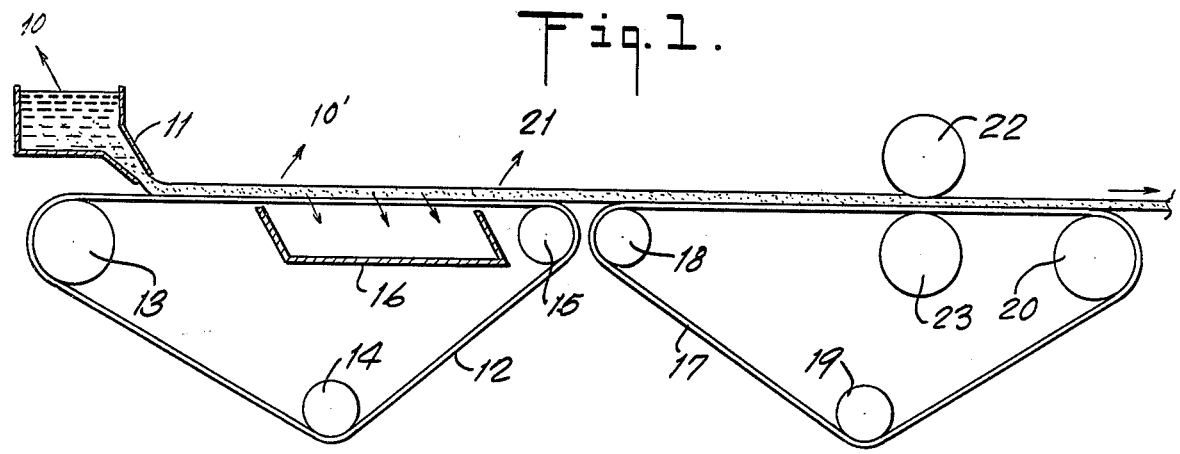
FIG. 1 is a schematic sectional view of the relevant portion of a papermaking machine using a papermaking felt.

In FIG. 1, there is shown a slurry 10, a slurry applicator 11, and an apertured belt 12 around rollers 13, 14 and 15. Fiber slurry 10 is applied to a belt 12 by slurry applicator 11 to form on the belt 12 a layer of fiber slurry 10'. The top run of the belt 12, with the fiber slurry layer 10' on it, passes over vacuum 16, which draws out a portion of the liquid from the slurry 10'. The slurry layer 10' which is now merely damp fibers 21 then passes over onto a paper-making felt 17, which is stretched around rollers 18, 19 and 20. The papermaking felt 17 bearing the damp fibers 21 is drawn through the nip of pressure rollers 22 and 23 by means which are conventional and not shown. The still damp fibers 21 then are drawn through a drier (not shown) where the balance of the liquid is removed.

Figure 2:
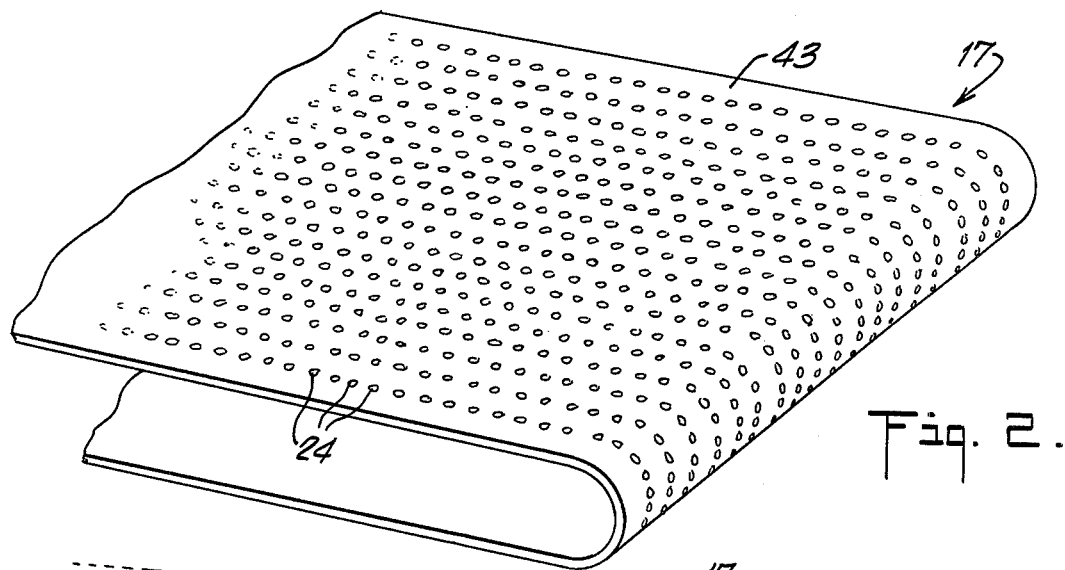
FIG. 2 is a perspective view of a part of a papermaking felt of this invention.

In FIG. 2, there is shown a product of the apparatus herein disclosed, namely the papermaking felt 17. It is in the form of a felt of any construction or composition known to the art with beads 24 of the plastic backing attached to its working surface 43.

Figure 3:
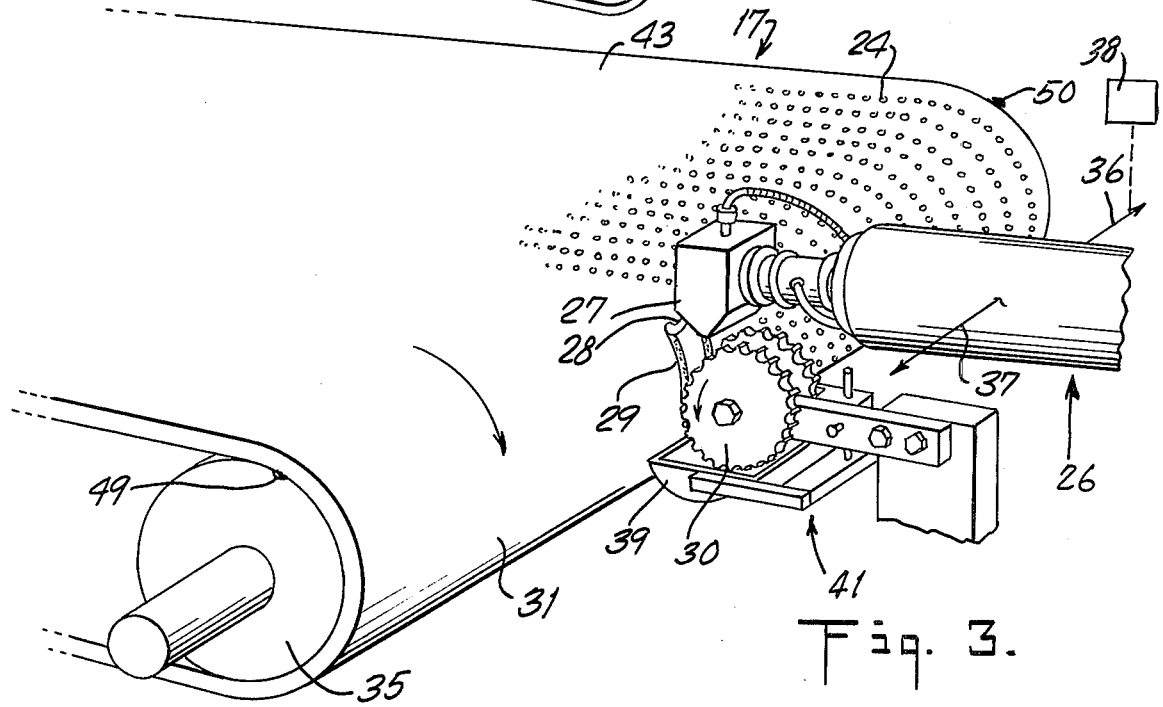
FIG. 3 is a perspective view of a preferred embodiment of the plastic bead applicating machine for making said papermaking felt.

FIG. 3 shows the papermaking felt 17, with some beads 24 already formed on its working surface 43. There are also shown means 26 for applying bands of plastic 29 and means 41 for inserting a portion of said band into said felt 17 to anchor beads 24. The means for supporting the working surface 43 of felt 17 in proximity to the applying means 26 are also shown. In this embodiment, the supporting means comprise a roller 35. Means (not shown) are provided for moving the means 26 and means 41 in the direction of the arrows 36, 37. These moving means may be any conventional means. Many are well known and need not be described here.

While in this embodiment a portion of the bead 24 is inserted in the felt 17, the invention does not require it.

The bead 24 can be allowed merely to dry on the felt 17. However, in the preferred embodiment, a portion of the bead 24 is inserted into the felt 17 in order to anchor the bead 24 to the felt.

In this embodiment, the means 26 for applying bands 29 is composed of a die 27 which extrudes plastic through die extrusions 28 to apply a band of plastic 29. Below that, is the means 41 for compression molding a portion of the band 29 into the working surface 43 of the felt 17. This comprises a wheel 30 for separating the band 29 into beads 24 and for compression molding portions of the beads of plastic 29 onto and into the working surface 43 of the felt 17.

In this embodiment, the wheel 30 is at the same time a portion of the means for applying a bead 26 (as it breaks up the band 29 into beads 24) and a portion of the means 41 for inserting. However, in another embodiment this need not be true. For instance, the plastic could be extruded as shown in FIG. 6. That figure shows an outer rod 45 into which is inserted an inner rod 46. The inner rod 46 is filled with plastic under a predetermined pressure. Both rods 45, 46 have holes 47, 48 respectively. The inner rod 46 rotates within rod 45. The holes 47, 48 are positioned so that as the inner rod 46 rotates the holes 47, 48 line up allowing plastic to drop onto the felt 17. Another method in which the plastic is extruded in drops utilizing pulsating pressure. This could be done, for instance, by using small mechanized pistons to control drop ejection and size.

It is also to be realized that the "plastic backing" can be any suitable material which can be extruded onto the felt, and is inert to the papermaking environment in which it will be employed. For the purposes of this invention, it is not necessary that the material be plastic. The wheel 30 and how it works will be better described below. It is noted that the means 26 for applying beads 24 and the means 41 for inserting the plastic into the felt are movable in the horizontal direction in this specific embodiment as shown by arrows 36, 37.

The felt 17 rotates around the roller 35 so as to present consecutive portions of the working surface 43 of felt 17 to the means 26 for applying beds 24 and the means 41 for inserting. In this fashion, as the felt 17 rotates one or more lines of beads 24 are put down depending on the number of dies 27 and die extrusions 28. The applying means 26 and the inserting means 41 are simultaneously moved over a desired interval or pitch to make a continuous process and another row is done. This continues until the felt 17 is filled with beads. There can be one or more applying means 26 and inserting means 41. The only limit as to the number used is the ability of the user to obtain a uniform rate of flow of the plastic through the die extrusions 28. There can also be any number of die extrusions 28 and inserting means 41 per applying means 26. This number is again limited by the ability to obtain a uniform rate of flow. It is within the scope of this invention that there be sufficient die extrusions 28 and wheels 30 to cover the entire width of the felt 17 and that, therefore, applying means 26 and inserting means 41 need not be movable. In the preferred embodiment, it has been found that the turning of the roller at about 100 to 150 feet per minute is the desirable speed in terms of optimizing the quality of the results versus that time necessary to complete the job. The spacing between the beads has been found in this specific embodiment to be optimized at ⅛ to 3/16 of an inch, and the means 26 for applying and the means 41 for inserting can be accordingly moved and the wheel 30 adjusted as shown below.

FIG. 4 shows a portion of the outer rim 32 of the wheel 30. The outer rim 32 has alternating indented portions 33 and protuberances 34. As shown in FIG. 5, the protuberances 34 punch portions of the band of plastic 29 into the working surface 43 of the felt 17 to form anchors 40 through intimate mechanical bonding. In this fashion, the band of plastic 29 is broken into beads 24 and the indented portions 33 of the wheel allow other portions of the band 29 to remain on top of the working surface 43 of the felt 17 forming bead 24. The bead 24 remaining on top is also compression molded to the working surface 43 to produce additional mechanical bonding. It is to be realized that the band 29 need not actually be broken as long as the connection 42 between the bead 24 and the anchor 40 is such that when a bead 24 is dislocated it by itself will be dislocated and the connection 42 will break before the next bead 24 is pulled off the felt 17. The shape of the indented portion 33 can be as desired so as to form a bead 24 of the desired width, height and shape. The spacing between indented portions 33 can be as desired, but as was stated above, the spacing between the dots should be ⅛ to 3/16 of an inch, and therefore the curved distance along the protuberances 34 should be the same.

FIG. 3 shows a cooling basin 39 which contains a cool liquid such as water with a surfactant such as soap. In this fashion, the wheel 30 is cooled so that when the wheel 30 runs over the band of plastic 29 the hot plastic cools quickly, and retains the form of the indented portion 33 and the surfactant eliminates any sticking tendency of the plastic to the wheel 30. The wheel 30 may also be coated with a release agent such as polytetrafluoroethylene.

If the felt 17 is long enough and the speed of the roller 35 is fast enough there might be a chance for the felt 17 to slip on the roller 35. Therefore, there can, optionally, be placed sensors or series of sensors 49 and 50 on the edge of roller 35 to detect when the felt 17 slips and does not track evenly on the roller 35. These series of sensors 49 and 50 then communicate the exact amount of slippage to the means 38 for moving means 26 in the directions 36 and 37. These means 38 would then move the means 26 for applying the beads 24 and compensate for the slippage of the felt 17. These series of sensors 49 and 50 are well known in the art and the means of communication to means 38 is also well known in the art. In this fashion, when the felt 17 makes a rotation around roller 35 the dots are put down as desired. If the felt 17 slips, the means 26 for applying the beads 24 moves with it and lays down a straight row of beads 24 despite the slippage.

We claim:

1. Apparatus for the attaching of bead to a papermaking felt comprising in combination:
    (a) means for supporting papermaking felt having a working surface;
    (b) means for affixing to such a working surface of such a felt a plurality of beads made of a material different from the material of the felt, such beads extending away from said working surface and having top portions which are spaced to form channels for liquid flow;
        (1) means operatively associated with said supporting means for affixing comprising means for applying a band of plastic to such a felt;

(2) means operatively associated with said means for applying for inserting at least a portion of such a band into such a felt; and (3) means operatively associated with said applying means for forming at least a portion of such a band into such beads.

2. An apparatus according to claim 1 wherein said means for supporting comprise a rotatable roller rotatably supporting said felt whereby upon rotation of said roller different portions of said felt are presented to said means for applying and said means for inserting.

3. An apparatus according to claim 1 wherein said applying means comprises at least one orifice through which molten plastic is emitted onto said felt.

4. An apparatus according to claim 3 wherein said molten plastic is emitted in a continuous band.

5. An apparatus according to claim 3 wherein there is a multiplicity of said orifices leading to a reservoir of said molten plastic.

6. An apparatus according to claim 2 wherein said inserting means comprise at least one rotatable wheel having spaced protuberances, said wheel being positionable to place said protuberances in an engaging relationship to said bead whereby when said roller rotate said protuberance pushes a portion of said bead into said felt.

7. An apparatus according to claim 5 wherein each of said orifices has a corresponding wheel having spaced protuberances being positionable to place said protuberances in an engaging relationship to the beads of that orifice.

8. An apparatus according to claim 2 wherein there are means operatively associated with said roller for sensing the shifting of said felt on said roller, said means for sensing being in communication with means for adjusting said means for applying and said means for inserting to compensate for said shifting.

9. An apparatus according to claim 6 wherein the nonprotruding portions of said wheel are shaped and engage such beads whereby such beads are shaped.

10. An apparatus according to claim 1 wherein said means for forming the band into beads include means for breaking such a band at points between such beads and such inserted portions, whereby should a bead be pulled off said felt, it will not pull with it any other portion of said band.

* * * * *